United States Patent
Khalimonenko et al.

(10) Patent No.: US 10,771,500 B2
(45) Date of Patent: Sep. 8, 2020

(54) SYSTEM AND METHOD OF DETERMINING DDOS ATTACKS

(71) Applicant: AO Kaspersky Lab, Moscow (RU)

(72) Inventors: Alexander A. Khalimonenko, Moscow (RU); Anton V. Tikhomirov, Moscow (RU); Sergey V. Konoplev, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 232 days.

(21) Appl. No.: 15/910,616

(22) Filed: Mar. 2, 2018

(65) Prior Publication Data

US 2019/0020680 A1    Jan. 17, 2019

(30) Foreign Application Priority Data

Jul. 17, 2017   (RU) .................................. 2017125333

(51) Int. Cl.
*H04L 29/06* (2006.01)
*H04L 29/08* (2006.01)

(52) U.S. Cl.
CPC ...... *H04L 63/1458* (2013.01); *H04L 63/1416* (2013.01); *H04L 67/025* (2013.01); *H04L 67/02* (2013.01)

(58) Field of Classification Search
CPC ............. G06F 21/566; G06F 2221/033; H04L 63/145; H04L 63/1416; H04L 63/1458; H04L 67/02; H04L 67/025
See application file for complete search history.

(56) References Cited

U.S. PATENT DOCUMENTS

| | | | |
|---|---|---|---|
| 9,521,162 B1 * | 12/2016 | Zand | H04L 63/1458 |
| 9,680,951 B1 | 6/2017 | Graham-Cumming | |
| 9,843,596 B1 * | 12/2017 | Averbuch | H04L 63/1416 |
| 2011/0214157 A1 | 9/2011 | Korsunsky et al. | |
| 2015/0229661 A1 * | 8/2015 | Balabine | H04L 63/1416 |
| | | | 726/22 |

(Continued)

OTHER PUBLICATIONS

Ying Xuan • Incheol Shin • My T Thai • Taieb Znati; Detecting Application Denial-of-Service Attacks: A Group-Testing-Based Approach, IEEE Transactions on Parallel and Distributed Systems (vol. 21, Issue: 8, pp. 1203-1216) (Year: 2009).*

(Continued)

*Primary Examiner* — Luu T Pham
*Assistant Examiner* — Chao Wang
(74) *Attorney, Agent, or Firm* — Arent Fox LLP; Michael Fainberg

(57) ABSTRACT

Disclosed are systems and methods for detecting distributed denial-of-service (DDoS) attack. An exemplary method includes receiving one or more requests from a first user for a service executing on a server, and generating a first vector associated with the first user comprised of a plurality of characteristics indicative of the first user accessing the service; calculating a comparison between the first vector and a reference vector, wherein the reference vector comprises an averaged distribution of characteristics for a plurality of users accessing the service, and determining that the service is under a denial-of-service attack based on the comparison between the first vector and the reference vector.

12 Claims, 6 Drawing Sheets

(56) References Cited

U.S. PATENT DOCUMENTS

| | | | |
|---|---|---|---|
| 2016/0127406 A1* | 5/2016 | Smith | H04L 63/1458 726/23 |
| 2016/0164912 A1* | 6/2016 | Del Fante | H04L 67/02 726/23 |
| 2016/0226896 A1 | 8/2016 | Bhogavilli et al. | |
| 2016/0381048 A1 | 12/2016 | Zhao et al. | |
| 2017/0126709 A1 | 5/2017 | Baradaran et al. | |
| 2017/0374098 A1* | 12/2017 | Kish | H04L 63/1458 |
| 2018/0026997 A1* | 1/2018 | Johnston | H04L 63/1416 726/23 |
| 2018/0041524 A1* | 2/2018 | Reddy | H04L 45/00 |
| 2018/0139229 A1* | 5/2018 | Osterweil | G06Q 30/02 |

OTHER PUBLICATIONS

Liao Qin • Li Hong • Kang Songlin • Liu Chuchu; Feature extraction and construction of application layer DDoS attack based on user behavior, Proceedings of the 33rd Chinese Control Conference (pp. 5492-5497) (Year: 2014).*

Mehdi Barati • Azizol Abdullah • Nur Izura Udzir • Ramlan Mahnnod • Norwati Mustapha; Distributed Denial of Service detection using hybrid machine learning technique, 2014 International Symposium on Biometrics and Security Technologies (ISBAST) (pp. 268-273) (Year: 2014).*

* cited by examiner

SYSTEM AND METHOD OF DETERMINING DDOS ATTACKS

CROSS REFERENCE TO RELATED APPLICATIONS

This application claims benefit of priority under 35 U.S.C. 119(a)-(d) to a Russian Patent Application No. 2017125333 filed on Jul. 17, 2017, which is incorporated by reference in its entirety herein.

FIELD OF TECHNOLOGY

The present disclosure relates to the field of computer security, and more particularly, to system and methods for detecting distributed denial-of-service (DDOS) attacks.

BACKGROUND

At present, practically all companies and organizations are represented in one way or another on the Internet, and many of them use the Internet as a business tool. At the same time, the Internet does not provide proper protection of services "by default". Furthermore, it is not possible today to defend against a number of Internet threats by personal protection means such as firewalls, attack prevention systems, antivirus, and so forth. A glaring example of such threats is the distributed denial-of-service (DDoS) attack.

A denial-of-service (DoS) attack is a cyber-attack on a computer system in order to cause it to fail, that is, the creation of such conditions in which legitimate (authorized) users cannot gain access to the resources (servers) being provided by the system, or in which such access is slower or more difficult. The motives for such attacks may differ widely—they may serve as elements of competitive activity, a means of extortion, revenge, an expression of discontent, a demonstration of capabilities or an attracting of attention, which is most often treated as cyberterrorism. If the attack is conducted simultaneously from a large number of computers, one speaks of a DDoS attack (Distributed Denial of Service). Two main varieties of DDoS attack exist: attacks on bandwidth and attacks on applications.

Attacks on bandwidth operate by clogging the communication channels, allocated bandwidth, and equipment with a large number of packets. The chosen victims are routers, servers, and firewalls, each of which has only limited processing resources (such as memory buffers, network interface bandwidth). Under the influence of the attack, these devices may become unavailable for the handling of proper transactions (i.e., legitimate requests), or they may crash under the unanticipated heavy workload. The most common form of a cyber-attack based on clogging bandwidth is a so-called avalanche attack with packet dispatching, during which a large number of seemingly trustworthy packets of the Transport Control Protocol (TCP), the user datagram protocol (UDP), or the Internet Control Message Protocol (ICMP) are sent to a particular point.

Attacks on applications operate by exploiting features of the behavior of networking protocols (TCP, HTTP and others), and also the behavior of services and applications, and seizes the computing resources of the computer on which the object of the attack is running, not allowing it to handle legitimate transactions and requests. Examples of an attack on applications are attacks with half-open HTTP connections and attacks with erroneous HTTP connections.

Recently, so-called "Slow-Rate" or "Low and Slow" attacks are becoming increasingly popular. Such attacks utilize deficiencies in the implementation of applications at the service end (such as a web server) and make it possible to put an important service at the server end out of commission by using only a small number of requests. The traffic volume which is generated during such an attack may be extremely slight, and therefore the detection and mitigation methods for attacks on bandwidth prove to be ineffective. Further, slow-rate attacks involve seemingly legitimate traffic (i.e., in term of protocol rules) which does not violate network standards or common security policies. As such, traditional detection and mitigation methods of attacks on applications often unable to distinguish such malicious data packets from legitimate ones because of their similarity.

An example of such a slow-rate attack is the Slowloris attack. This method of attack may even be carried out by a single computer. This attack involves sending incomplete HTTP requests (partial ones, e.g., for a GET request), where the host afterwards sends additional headers, but the request itself is never completed. Thus, the server reserves all the sockets for HTTP processing, which results in a denial of service of other clients. The attack takes a long time.

In a number of recent patent publications, such as United States Publication No. 2016/0226896, it has been proposed to perform an analysis of the data based on a network protocol, specifically the Secure Sockets Layer (SSL) protocol. Such analysis is highly protocol-specific, however. As such, the known analytical techniques may be rendered useless in detecting or mitigating such slow-rate attacks in the event that future attacks utilize other protocols or if the specific protocol changes (e.g., in a next version). A more flexible and universal solution is needed for the analysis of data packets from users regardless of the protocol being used for an earlier determination of a possible network attack on a server.

Moreover, cases are known where another attack was carried out behind a DDoS attack, known as a targeted cyberattack or Advanced Persistent Threat (APT). Therefore, a solution is needed which is able not only to discover and neutralize a DDoS attack, but also to provide feedback to the entire protective infrastructure of the organization at which the DDoS attack is directed. An analysis of the existing prior art leads to the conclusion that the previous technologies are ineffective and in certain cases cannot be applied, and their deficiencies are solved by the aspects of present disclosure.

SUMMARY

Disclosed are systems and methods for detecting distributed denial-of-service (DDoS) attack. An exemplary method includes receiving one or more requests from a first user for a service executing on a server, and generating a first vector associated with the first user comprised of a plurality of characteristics indicative of the first user accessing the service. The method further includes calculating a comparison between the first vector and a reference vector, wherein the reference vector comprises an averaged distribution of characteristics for a plurality of users accessing the service. The method includes determining that the service is under a denial-of-service attack based on the comparison between the first vector and the reference vector.

In another exemplary aspect, a system configured for protecting against a distributed denial-of-service (DDoS) attack is provided. The system includes a memory device, and a hardware processor. The hardware processor is configured to receive one or more requests from a first user for a service executing on a server, and generate a first vector associated with the first user comprised of a plurality of characteristics indicative of the first user accessing the service. The processor is further configured to calculate a comparison between the first vector and a reference vector, wherein the reference vector comprises an averaged distribution of characteristics for a plurality of users accessing the service. The processor is further configured to determine that the service is under a denial-of-service attack based on the comparison between the first vector and the reference vector.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 7A shows an example of the interaction of a protection module and a security application during a detected attack.

FIG. 7B shows an example of the interaction of the protection module and the security application when an attack is let through.

DETAILED DESCRIPTION

Exemplary aspects are described herein in the context of a system, method, and computer program product for detecting DDoS attacks on user computers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
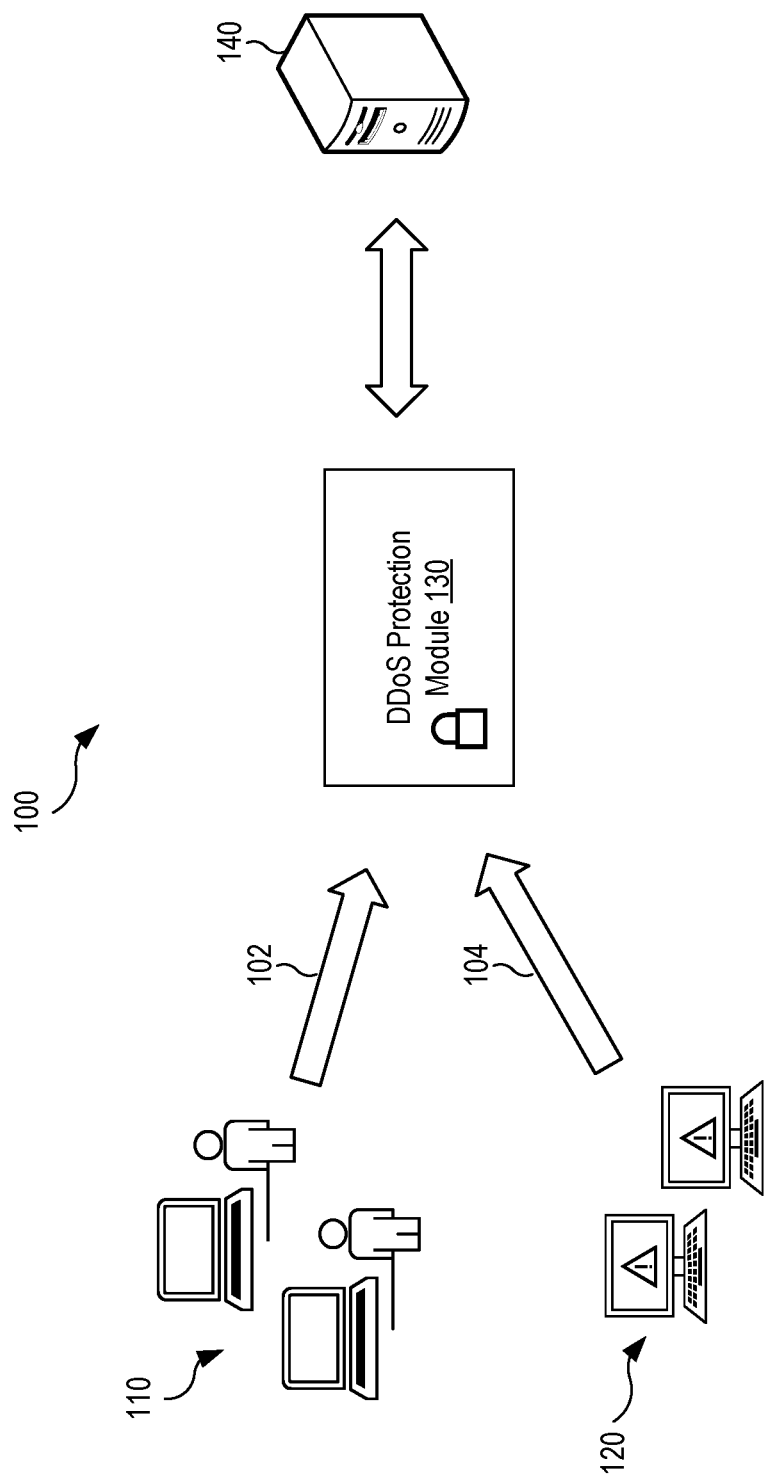
FIG. 1 is a block diagram illustrating a system for processing traffic and protecting against DDoS attacks, according to an exemplary aspect.

FIG. 1 is a block diagram illustrating a system 100 for processing traffic and protecting against DDoS attacks, according to an exemplary aspect. The system 100 includes a DDoS protection module 130 communicatively connected to a server 140 and configured to protect the server 140 against DDoS attacks. As shown, a plurality of (legitimate) users 110 may make requests 102 to the server 140. In the following, all examples shall pertain to the protection of this server 140. Besides the server itself in the traditional understanding (i.e., a website where the users 110 go from their browsers), there may also be present any given web services constructed with the use of the modern standards like HTML, XML, WSDL (Web Service Definition Language), SOAP. Furthermore, the server 140 may provide interfaces for access to other services, such as a database management system or DBMS (not shown). It should also be understood that the server 140 may include not just one physical computer (server), but an entire group (a cluster or data center) having their own load balancing mechanisms.

Requests may arrive at the server 140 not only from ordinary users 110 but also from malicious users (or bots) 120. The goal of such users 120 is to attack the server 140 using a plurality of requests 104. In some aspects, the requests 104 constitute a bandwidth-flood directed against the bandwidth of the server 140, both in terms of quantity (bytes per second) and frequency (requests per second), which affects the network bandwidth itself and the resources of the server 140 (e.g., CPU) to handle the flood of requests. In some aspects, the attack may be an application-layer attack directed against applications running on the server (such as a web server). It is noted that both ordinary users 110 and malicious users 120 are clients of the server 140. For protection against such attacks, the DDoS protection module 130 is used. The present disclosure shall examine its working in more detail, for which it is necessary to discuss in more detail the process of a user visiting a server.

A user 110 (or a malicious user 120) sends a request (e.g., request 102, 104) to the server 140, e.g., using a web browser application, or they send a data packet already formatted in a special way. For example, the request may be an HTTP request specifying a GET method, or in other cases, a POST method. An example request having a plurality of parameters is provided below:

Listing 1: Example HTTP request

```
1  GET /path/to/resource/ HTTP/1.1
2  Host: site.com
3  User-Agent: Mozilla/5.0 (Windows; U; Windows NT 6.1; en-US; rv:1.9.1.5)
4  Gecko/20091102 Firefox/3.5.5 (.NET CLR 3.5.30729)
5  Accept: text/html,application/xhtml+xml,application/xml;q=0.9,*/*;q=0.8
6  Accept-Language: en-us,en;q=0.5
7  Accept-Encoding: gzip,deflate
```

Listing 1: Example HTTP request

```
8   Accept-Charset: ISO-8859-1,utf-8;q=0.7,*;q=0.7
9   Keep-Alive: 300
10  Connection: keep-alive
11  Cookie: PHPSESSID=r2t5uvjq435r4q7ib3vtdjq120
12  Pragma: no-cache
13  Cache-Control: no-cache
```

As shown in Lines 1 and 2, the request includes a path to a source by which the user gains access. In the example above, the request specifies the path "/path/to/resource/" and a name of host (e.g. site.com). The path may be formatted as a Universal Resource Identifier (URI), also referred to as a Universal Resource Location (URL) for access to web pages. The path may be unique or dynamic, i.e., formatted during an exchange of information between the user's browser and the server 140. By using hashing methods, such as fuzzy hash sums, it is possible to format a finite set of paths for access to the server 140.

Figure 2:
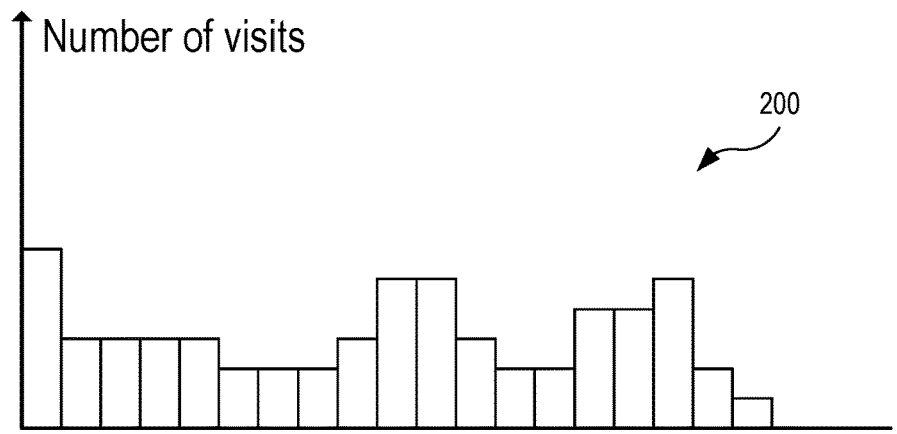
FIG. 2 presents a histogram of a histogram of requests from a typical human user.

Thus, for each user (e.g., users 110, 120), it is possible to construct a histogram of a number of requests to the server 140 by path identifier. FIG. 2 depicts such a histogram 200. Ordinary users navigate through the site, sending requests to the server 140, as a result of which the histogram 200 of their visits usually includes a number of requests with different paths. In one example scenario involving e-commerce, a user first enters an online store's URL into the web browser (first path), searches for a desired product (several different paths), reads reviews and places an order (again, several different paths) within the online store.

In one exemplary aspect, for each user, it is possible to construct a histogram based on the frequency of requests made to the server 140. Ordinary users navigate through the site, sending requests manually. Thus, for example, even when the "Refresh" button is pressed repeatedly in the browser, the frequency of requests of an ordinary user does not exceed a certain threshold requests per second, say, 5 requests per second.

In one aspect, the histogram of the frequency of making requests is constructed by using the page (URL) accessed by the user. Thus, the fewer links the page contains to other pages, the fewer requests (in quantity and in frequency) are made by the user when navigating from this page.

In another aspect, the histogram of the frequency of requests made is constructed using the protocol by which the user is interacting. Thus, for example, the TCP protocol guarantees delivery of packets, and therefore a repeated request to the same page will indicate an attack.

In another aspect, the histogram of the frequency of requests made is constructed using the content of the resource (e.g., URL, webpage) accessed by the user. Thus, if the page contains a certain refreshable chart (such as Forex), the normal refresh frequency is once every 5 seconds. If the page contains news (such as the site of a news agency), the normal refresh frequency is once every minute. But if the page contains static information (such as a Wikipedia page), repeated access of the page may also indicate the start of an attack on the service.

Figure 3:
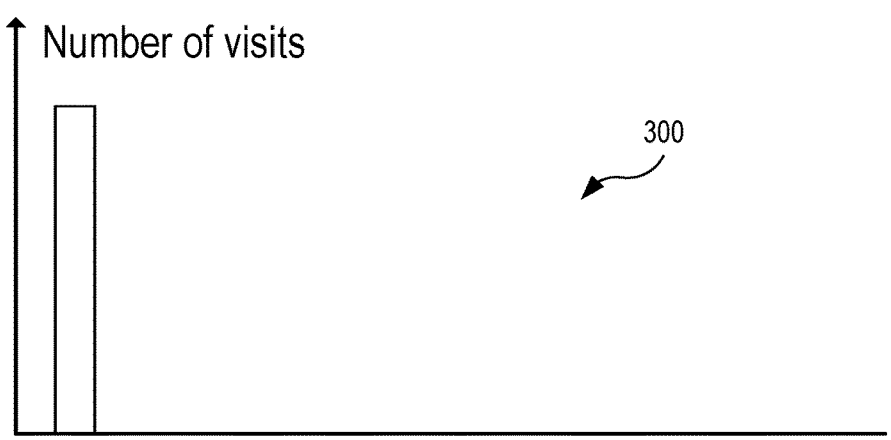
FIG. 3 presents a histogram of requests from a malicious user (bot).
Figure 4:
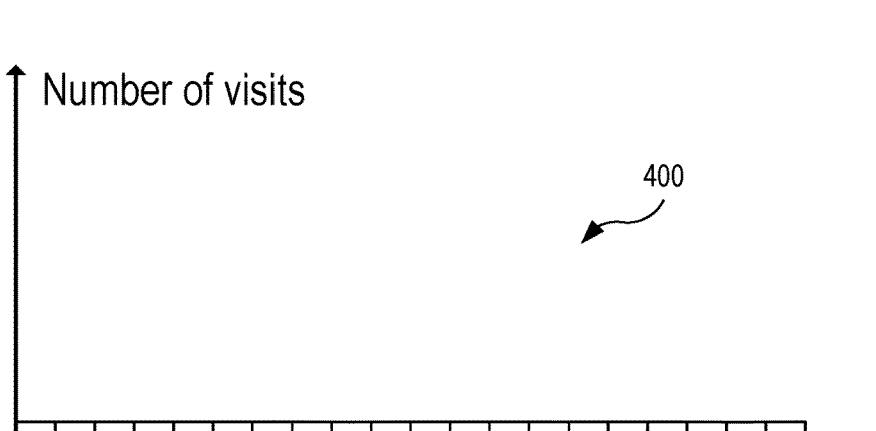
FIG. 4 presents a histogram of requests from a search engine bot.

FIG. 3 presents a histogram 300 of requests on the part of a malicious user (bot) 120, which generally gains access by a certain path (occasionally several paths), as can be seen as a single column in the histogram. This behavior is not similar to the behavior of an ordinary user 110 in FIG. 2. For sake of comparison, FIG. 4 presents a histogram 400 of requests from a search engine bot, sometimes referred to as a web crawler or spider. Search engine bots are programs that traverse web sites, generally by using methods of recursive traversal in order to examine all the pages on the web site, and then construct its site map. As can be seen from these histograms 200, 300, 400, the behavior of the different users (or programs and bots) may differ greatly, which can be used by the DDoS protection module 130. In the following, the DDoS protection module 130 shall be described as the protection module 130 for short.

Figure 5:
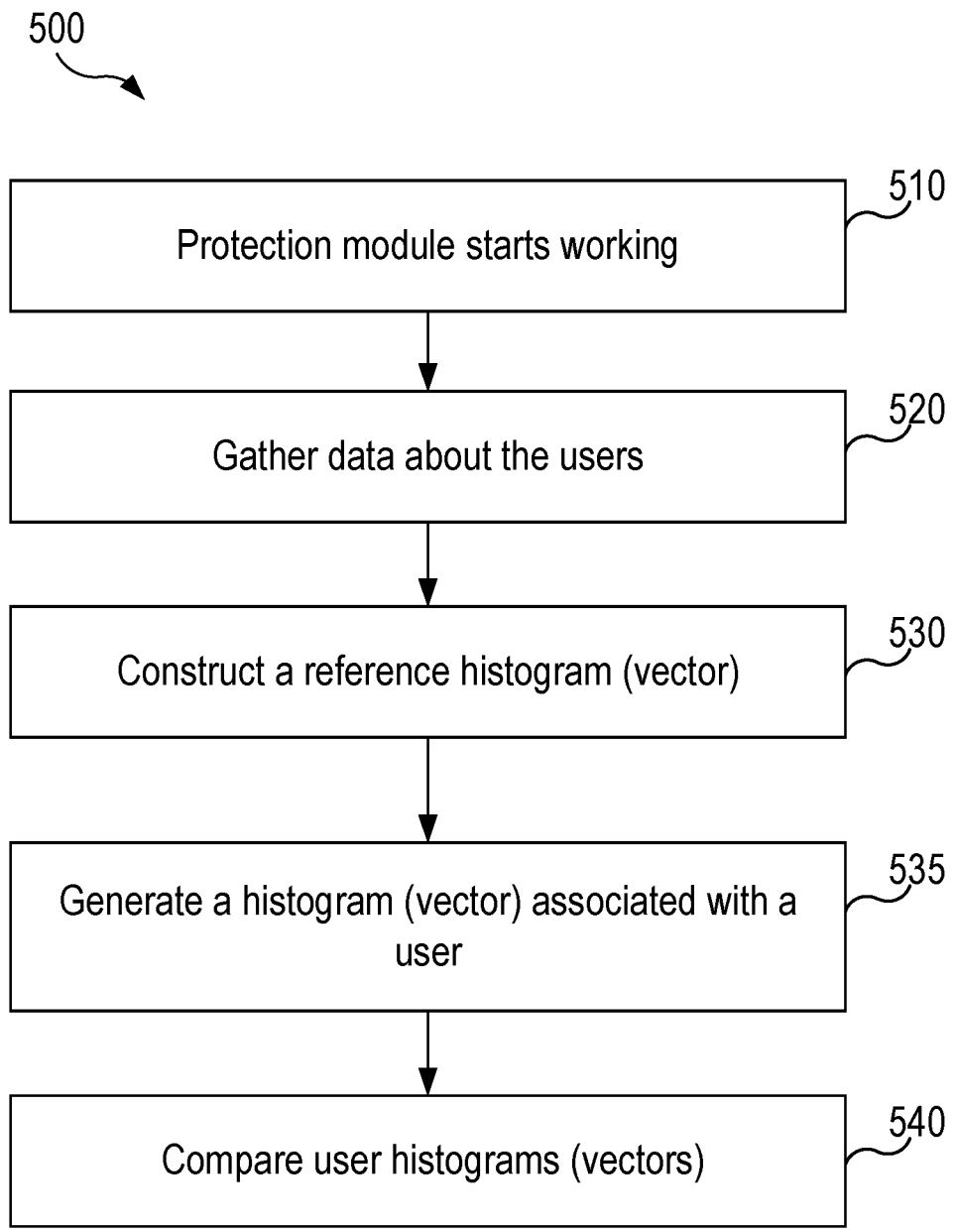
FIG. 5 is a flowchart illustrating a method for protecting against DDoS attacks based on data gathered from users according to an exemplary aspect.

FIG. 5 is a flowchart illustrating a method 500 for protecting against DDoS attacks based on data gathered from users according to an exemplary aspect. It is noted that the following description of the exemplary method makes reference to the system and components described above. At the time of step 510 the protection module 130 has no data on the users and at the time of the commencement of its work, the protection module 130 needs to gather statistics on every possible user (both ordinary 110 and malicious 120), which is done during step 520.

At step 520, the protection module 130 generates a reference vector based on the gathered data. The reference vector may include an averaged distribution of characteristics for a plurality of users accessing the service. In some aspects, the protection module 130 generates a reference vector based on gathered data associated with parameters of HTTP requests from the plurality of users. In another aspect, the protection module 130 may gather data having path specified by requests to the service from the plurality of users, and generates the reference vector as an averaged frequency of requests by path.

The duration of step 520 may be from a duration comprised of several seconds or minutes, or to longer durations, such as days or weeks. In some aspects, the duration of gathering the data (step 520) may be dynamically modified during operations based on feedback to the protection module's ability to detect DoS attacks. As a rule, already after several minutes, it will be possible to construct in step 530 a reference histogram, which is an averaged histogram for all the users. The primary assumption in this case is that the overwhelming majority of users are ordinary (legitimate) users 110 and the data about them makes it possible to "smooth out" the data about the malicious users 120.

In one aspect, the protection module 130, after being launched, uses a histogram of users obtained statistically on other resources. For example, the protection module 130 may receive a histogram of user requests received from a security network service. The security network service may be a cloud-based service that compiles and provides data related to new or already known threats, applications' reputation data, websites' reputation data, and other data related to detected threats and suspicious activities. An example of a security network service may be the Kaspersky Security Network (KSN) made available by Kaspersky Labs®.

Further on in the context of the application, the present disclosure shall replace the concept of the histogram with a vector, which is comprised of a number of properties characterizing a user accessing the server 140. The vector may include the already mentioned data on the paths (URIs) requested by the user (visited by using a browser). The vector may further include other parameters derived from the received requests. In some aspects, the vector may include an indication of the protocol (and version) of the request, such as "HTTP 1.1". In some aspects, the vector may include information about the port number on which the request is received. In some aspects, the vector may include header fields of the received requests, such as "User-Agent", or "Referrer" (in the case of HTTP); information about the (source) IP address of the user; an SSL session identifier; the server's response code to a request, and other information.

In step 535, the protection module 130 generates a vector associated with the user comprised of a plurality of characteristics indicative of the user accessing the service. In step 540, the protection module 130 may compare the generated vector with the reference vector (histogram), to determine how much a particular user fits the profile of a standard user, which, as previously noted, corresponds to a certain "average" user. In one aspect, an "average" (standard) user is a conventional user whose vector is an arithmetic mean in regards to all obtained vectors. Other methods of calculating mean values may employ a weighted arithmetic mean, a harmonic mean, or a weighted harmonic mean. In some aspects, the protection module 130 may determine that the service is under a denial-of-service attack based on the comparison between the generated vector and the reference vector.

Comparison of the vectors may be done with the use of different comparison techniques, such as the Levenshtein distance, Hemming distance, the Jaccard index, and other metrics. With regard to the use of such comparison metrics, it may be said that the described technique refrains from concepts such as whether a particular user is "good" (users 110) or "bad" (users 120). One may consider a good (legitimate) user to be one whose distance between their vector and the vector of the standard user (i.e., reference vector) to be less than a specified threshold value. By using such a metric, one may perform a classification of the users, such as seen in Table 1 below.

TABLE 1

Example Classification

| Difference between user's vector and reference vector | Classification of user |
|---|---|
| <0.1 | Ordinary (legitimate) user |
| <0.3 | Search engine bot |
| >1 | Malicious user |

As shown in Table 1, responsive to determining the calculated difference between a user's vector and the reference vector exceeds a threshold value (e.g., >1), the protection module 130 may determine (i.e., classify) that user as a malicious user. In other cases, responsive to determining the calculated difference is less than a second threshold value (e.g., <0.1), the protection module 130 may determine (classify) that the user is a legitimate user.

For low-and-slow attacks, one may additionally analyze factors on the level of the TCP protocol, such as the transmission speed of requests, and the generated responses from the user (in the case of slow HTTP POST attacks), including these parameters in the user's vector. Such attacks can be characterized by a low transmittal speed of requests as compared to ordinary DDoS attacks on bandwidth. For example, 1000 connections with 200 requests per second are enough for a web server to be able to handle only a third of the connections and others are pending. The requests themselves may contain allowable data (for example, properly formatted headers), which does not allow judging each request alone as malicious.

It has been determined the principal characteristics of low-and-slow attacks may be as follows. The requests from low-and-slow attacks are similar to requests from legitimate users 110. The conventional techniques for detecting DDoS attacks (e.g., bandwidth floods) do not allow detection of such an attack. Methods from Intrusion Prevention systems (IPS) and Intrusion Detection systems (IDS) that are based on signature detection or detection of anomalies also cannot detect such an attack. A low-and-slow attack does not require a large number of resources and may be carried out from a single computer. Such attacks may put a web server out of commission, even one with a large reserve hardware capacity. Aspects of the present disclosure will now describe a more detailed utilization and comparison of the vectors of users taking into account data from the infrastructure of the server 140.

Figure 6:
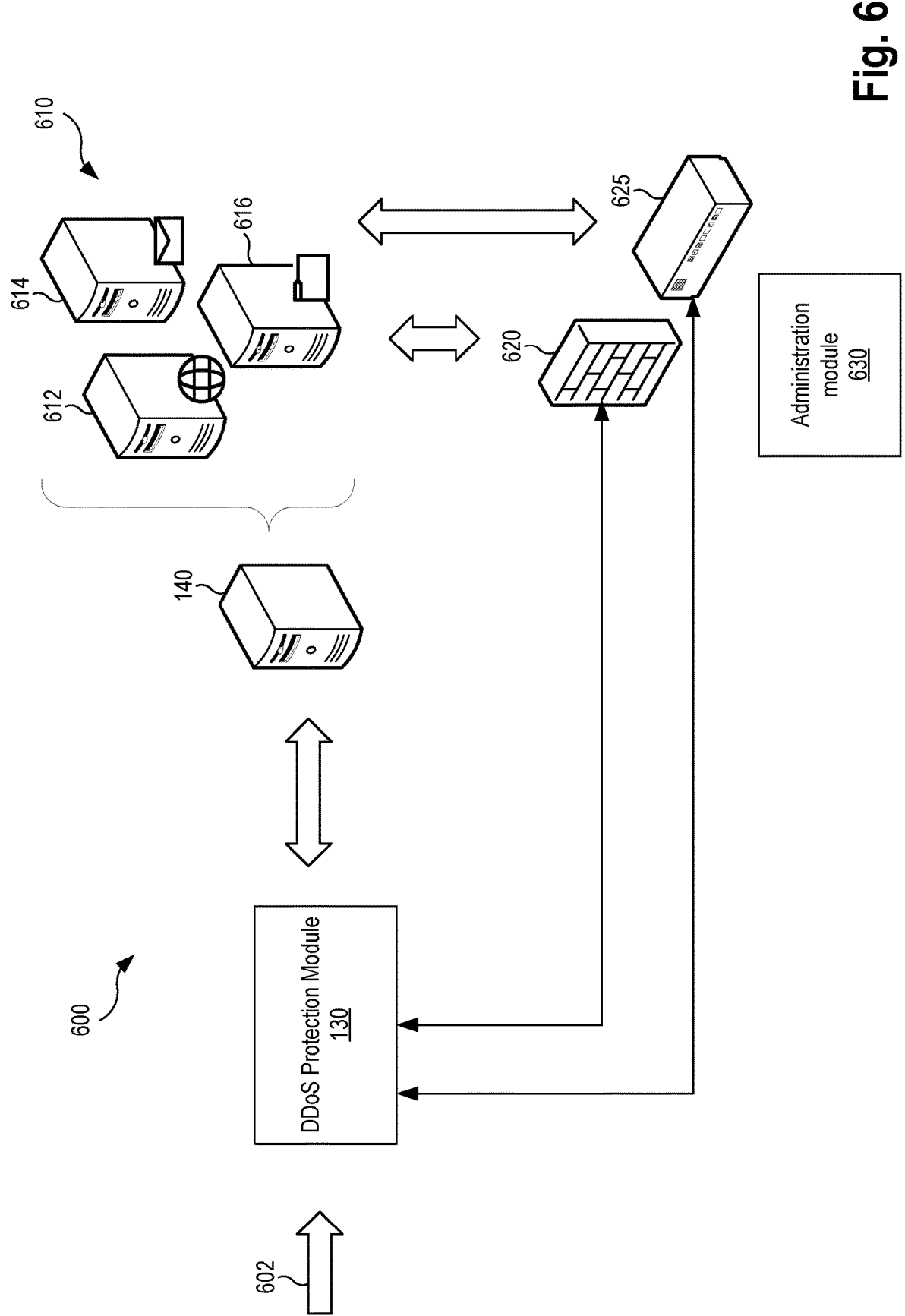
FIG. 6 is a block diagram illustrating a system for processing traffic and protecting against DDoS attacks, according to an exemplary aspect.

FIG. 6 is a block diagram illustrating a system 600 for processing traffic and protecting against DDoS attacks, according to an exemplary aspect. The system 600 includes a DDoS protection module 130 communicatively connected to a server 140 and configured to protect the server 140 against DDoS attacks. The system 600 is similar to the system 100 depicted in FIG. 1 except that, on the side of the server 140, the server-side infrastructure is represented in further detail. For example, the server 140 may include various services 610 (such as web server 612, mail server 614, FTP server 616, and others) executing thereon.

According to one aspect, the system 600 may include one or more applications 620 responsible for security. The security applications 620 may be IPS/IDS solutions, firewall (s), elements of SIEM (Security Information and Event Management) solutions, and DLP modules. Examples of such solutions are applications such as Kaspersky Security® for Microsoft Exchange Servers™ or Endpoint Security for Windows™. In one aspect, the system 600 may further include computing and/or networking hardware 625 with built-in protection mechanisms, for example, such as routers made available by Cisco®. The security application(s) 620 and/or hardware 625 may obtain information from the services 610, configure them (change their settings), and exchange information with the protection module 130. The information exchange between the protection module 130 and the application(s) 620 may be done with the use of known protocols and data formats, such as JSON (JavaScript Object Notation). In the following, by application(s) 620, the present disclosure refers to a full set of applications 620 responsible for computer security. In one exemplary aspect, the security application 620 is the firmware of at least one of the hardware devices 625.

According to one aspect, the system 600 includes an administration module 630 (e.g., executing as a software application) configured to centrally manage the security applications 620 and hardware with built-in protection mechanisms 625. The administration module 630 may be used (e.g., by a system administrator) to generate security policies for the system 600 and distribute configurations of the various security applications 620 and hardware devices 625 according to those security policies. Examples of an administration module 630 may be applications such as Kaspersky Security Center™ or McAfee ePolicy Orchestrator™.

In some aspects, the protection module 130 may be configured to process event notifications received by the security application 620 (e.g., from the services 610). Examples of notifications which may be received from the services 610 by the security application 620 and how this information can be processed by the application 620 and the protection module 130 are provided below.

Example 1

Because of an attack on the server 140, one of the services 610, such as the web server 612, has stopped properly handling requests 602 from the users. In turn, the application 620 restarts the service 610, and may also change the settings of the service 610 to more suitable ones for protection against an attack. For example, the security application 620 may modify a web server configuration file (such as "httpd.conf" in the case of an Apache web server) to set a timeout for receiving an HTTP request header and the HTTP request body from a user. If a user fails to send a header of body data within a configured timeout period, the web server 612 sends a request time out error (e.g., 408 REQUEST TIME OUT). The below example configuration file allows up a user up to 20 seconds to send the header data and an maximum of 40 seconds for the headers to complete (i.e., "header=20-40"):

| Listing 2: Example Configuration File |
| --- |
| 1         <IfModule mod_reqtimeout.c> |
| 2         RequestReadTimeout header=20-40,MinRate=500 body=20,MinRate=500 |
| 3         </IfModule> |

In addition, the application 620 sends data to the protection module 130 as to the incorrect working of the service 610 for subsequent reconfiguration of the working parameters of the protection module 130. Examples of reconfiguration of the working of the protection module 130 shall be given below.

Example 2

In one aspect, because of an attack on the server 140, one of the services 610, such as a web server 612, stopped properly handling the requests of the users. In turn, the application 620 receives information from the protection module 130 that the attack was directed at a particular version of the web server (e.g., Apache version 2.2.15), and for successful protection against it a supplemental web server (such as Nginx®) is turned on in proxy mode before the attacked web server 612.

Example 3

In another aspect, the protection module 130 may detect that a user 120 has an atypical vector associated with the behavior of constantly accessing a page with a password. In response, the protection module 130 may send information about this user 120 to a security application 620. On the part of the application 620 a conclusion is drawn that a brute force attack is occurring and it is necessary either to reconfigure the corresponding application or module (such as IPS) or to add the IP address of the computer of the user 120 from which this attack is occurring to the blacklist.

Example 4

In another aspect, the protection module 130 sends information about a user 110 who has an atypical vector, in which it is evident that the user 110 is constantly accessing a particular service 610 (such as constantly downloading files from an FTP server 616). Even though the IP address of the computer of the user 110 is on a white list, such information from the protection module 130 will result in the conclusion, on the part of the application 620, that a data leak is occurring and that it is necessary either to reconfigure the corresponding application or module (such as data loss prevention, or DLP) or to add the IP address of the computer of the user 110 from which this attack is occurring to the blacklist.

Example 5

In another aspect, the application 620 may determine that an attack of a HTTP Response Splitting type is occurring. Such an attack generally involves the absence of a proper HTTP verification of a header on the part of a web server. In response to such an attack, the application 620 may reconfigure the protection module 130 for analysis of the HTTP headers.

Examples shall be considered for the reconfiguration of the protection module 130 to detect slow-type cyberattacks based on information provided by the security applications 620 and hardware 625. As already mentioned, the vector may include data and metrics indicating, for example, the number of pages visited or requests for their URIs in an interval of time, the protocol being used (such as HTTP), the number of the port; the headers, and the IP address.

In one example of a change to a vector, the application 620 alerts the protection module 130 as to the fact that the web server 612 has ceased handling requests of users because of a possible low-and-slow cyberattack. Upon analysis of this information, the protection module 130 changes the interval of time in which information is gathered as to the number of pages visited or requests for their URIs—for example, from 10 minutes to 5 minutes. As a result of this, according to the classification example given above, the difference between the vector of the user and the reference vector has exceeded 1 relative to the reference vector, and a malicious user 120 who is carrying out a low-and-slow cyberattack will now be detected as a result of the modified vector.

Another example of a change to a vector involves solving a problem related to a large volume of data. For example, the vector may be over-inclusive with too much data (i.e., noise), such that none of the vectors compared with the reference vector exceeds the threshold value, and all the users are deemed normal (legitimate). However, if certain data is excluded from the vector—for example, information on the headers, which may be identical in the overwhelming majority of users (both ordinary 110 and malicious 120)—then the values of the vectors will be changed and it will become possible to classify the users more accurately. One example of the solution of such a problem (dimensionality reduction) is the method of principal components (principal component analysis, PCA).

Yet another example of changing the vector includes the addition of new parameters. For example, after adding another service 610 which works with the REST protocol, the protection module 130 may analyze data relating to the operations of the new service. One example of the data transmitted via this protocol is shown below.

---
Listing 3: Example REST Protocol data

```
4    <?xml version="1.0"?>
5      <discussion date="{date}" topic="{topic}">
6        <comment>{comment}</comment>
7        <replies>
8             <reply from="someone@mail.com"
                   href="/topics/{topic}/someone"/>
9             <reply from="someone2@mail.com"
                   href="/topics/{topic}/someone2"/>
10       </replies>
11     </discussion>
```
---

Thus, for the protection module 130 there is also added a parser of the protocol being used, which will allow information to be extracted as to the necessary tags (such as the <reply> tag), which it will be possible to insert into the vector for the analysis.

The present disclosure also presents an example of a possible correlation of data between the protection module 130 and the application 620. For example, the protection module 130 ascertains a DDoS attack has occurred at company A. Afterwards it was likewise discovered that during the attack, some of the services 610 did not work properly. From one of the DBMS (likewise one of the services 610), important information was transcribed, which was recorded in one of the logs of the application 620. Thus, it may be determined that the DDoS attack was used to draw attention away from the theft of data. For the future detection of such correlations, the following information is saved in the form of a rule as follows. In response to determining an attack from a vector and that the vector has specified characteristics, then the protection module 130 configures the application 620 (such as the DLP or IDS modules) to counteract the leakage of data on the part of one of the services 610 (such as the DBMS). Such a rule may be saved and used by a linking of the protection module 130 and the application 620 on the part of any other company utilizing such a service.

In some aspects, the protection module 130 may generate one or more rules with the help of machine learning methods. Examples of machine learning techniques that may be used to generate rules for configuring the security application 620 include the use of regression models, such as linear or logical regression, support vector machine, artificial neural networks, and clustering.

In the example of a simple neural network with one hidden layer it is possible to construct rules analogous to the one given above. For example, the neurons from the input layer of the neural net will receive data from the protection module 130. The learning (i.e., the assignment of weights to neurons) can be done on the basis of already known incidents.

Furthermore, the aforementioned rules may be written in high-level language, such as JavaScript, and the rules will assume the following appearance:

---
Listing 4: Example Rule Format

```
12   If (condition) {
13        # code for the configuring of variables
14   }
```
---

In one aspect, the administration module 630 is may be configured to modify and manage configurations of applications 620 and hardware 625 with built-in protection mechanisms using automation technology. This technology provides a network administrator with the ability to automate the antivirus protection or control the settings of the applications 620 and hardware 625, with the aid of writing scripts and startup scenarios. An example of such technology is Administration Kit Automation 10 made available in Kaspersky Security Center™ 10. In some aspects, the administration module 620 may receive a script using OLE components (Object Linking and Embedding) or ActiveX components. The script may be written in languages, such as Jscript and VBScript, as well as in high-level languages which support the OLE technology (such as C, C++, Visual Basic, Visual Basic .NET, C #, J #). Thus, the operations of the administration module 630 can be fully automated in the case when the configuration of the applications 620 and the hardware with built-in protection mechanisms 625 is done with the aid of the aforementioned rules which have been written in high-level languages.

Figure 7:
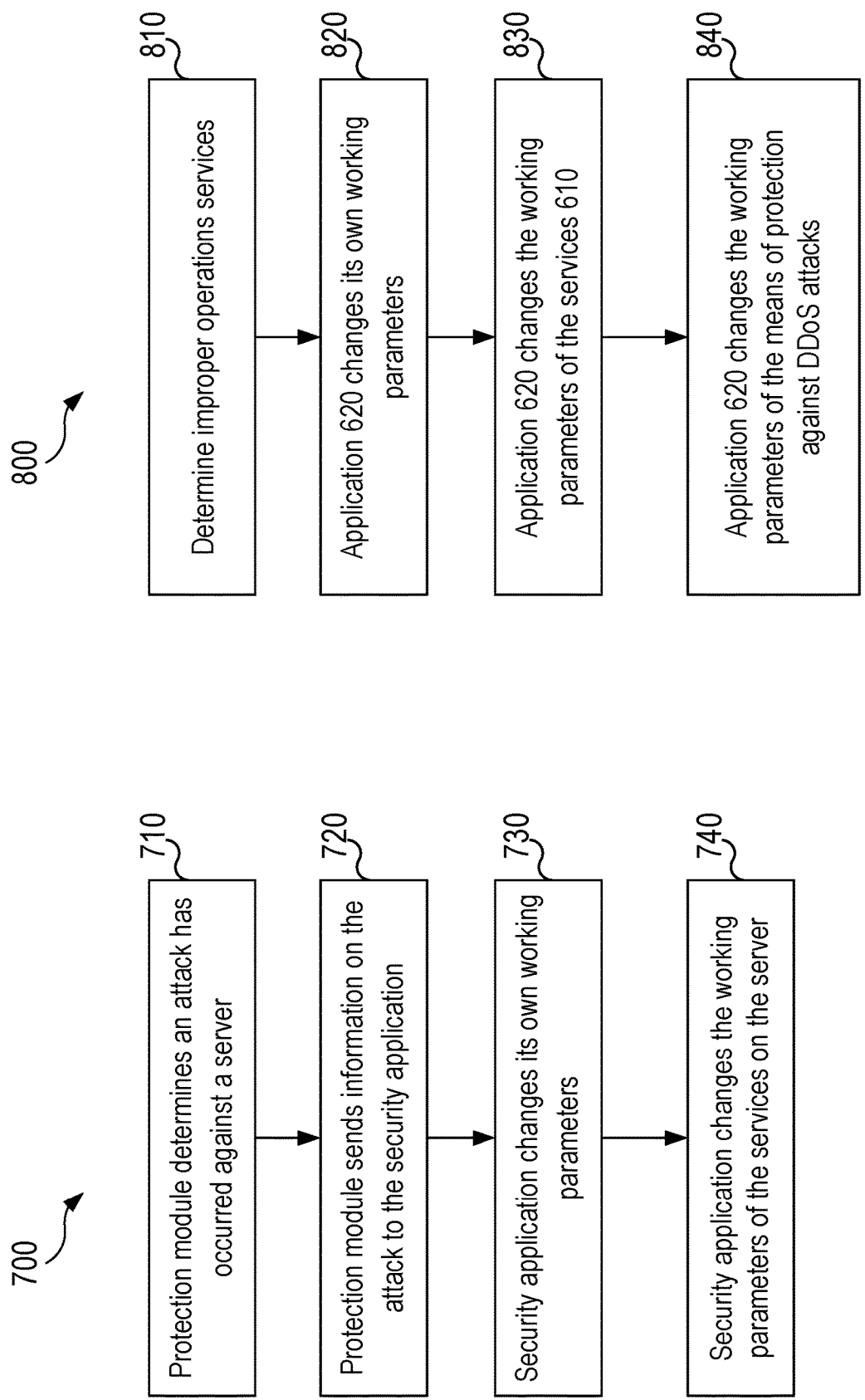

FIG. 7A shows an example of the interaction 700 of the protection module 130 and the application 620 during a detected attack on the part of the protection module 130. In step 710 the protection module 130 determines a DoS attack (or any other attack which can be detected, such as the "Low and Slow" type) against the server 140 and its services 610. Next, in step 720, the protection module 130 sends information about the parameters of the attack (its vector) to the application 620. The application 620 in turn makes changes to the mechanism of its own working. For example, the security application 620 may add the IP address of the attacker to a blacklist. Also during step 740 the application 620 makes changes to the operating parameters of the services 610—for example, it modifies the operational parameters of a web server by updating its configuration file and restarting the service.

FIG. 7B shows an example of the interaction 800 of the protection module 130 and the application 620 when an attack is passed through (e.g. missed) on the part of the protection module 130. The application 620 in step 810 determines that one of the services is running improperly—for example, the web server 612 is not responding to requests from users or the DBMS is transmitting unusually large volumes of data. If such anomalies have been registered, then in step 820 the application 620 changes the parameters of its own operation. For example, the application 620 starts an antivirus scan of the computer where the improperly running services 610 are located. Subsequently, in step 830, the security application 630 changes the operating parameters of the aforementioned services in whose execution the anomaly was detected. After this, in step 840, the application 620 makes changes to the operating parameters of the protection module 130. For example, the security application 620 may change the interval of time during which data is gathered on user requests from the server 140 (and the corresponding services 610).

In the present disclosure, the modules and devices 630, 620, 625, and 140 may be implemented as actual devices, systems, components, a group of components realized with the use of hardware, such as integrated microcircuits (application-specific integrated circuit, ASIC) or a programmable gate array (field-programmable gate array, FPGA) or, for example, in the form of a combination of software and hardware, such as a microprocessor system and a set of software instructions, as well as neuromorphic chips (neurosynaptic chips). The functionality of the modules 630, 620, 625 and 140 can be realized exclusively by hardware, and also in the form of a combination, where some of the functionality is realized by software, and some by hardware (software/hardware complex). In some exemplary aspects, some of the modules 630, 620, 625 and 140 may be implemented on the processor of a general-purpose computer system (described in FIG. 8).

Figure 8:
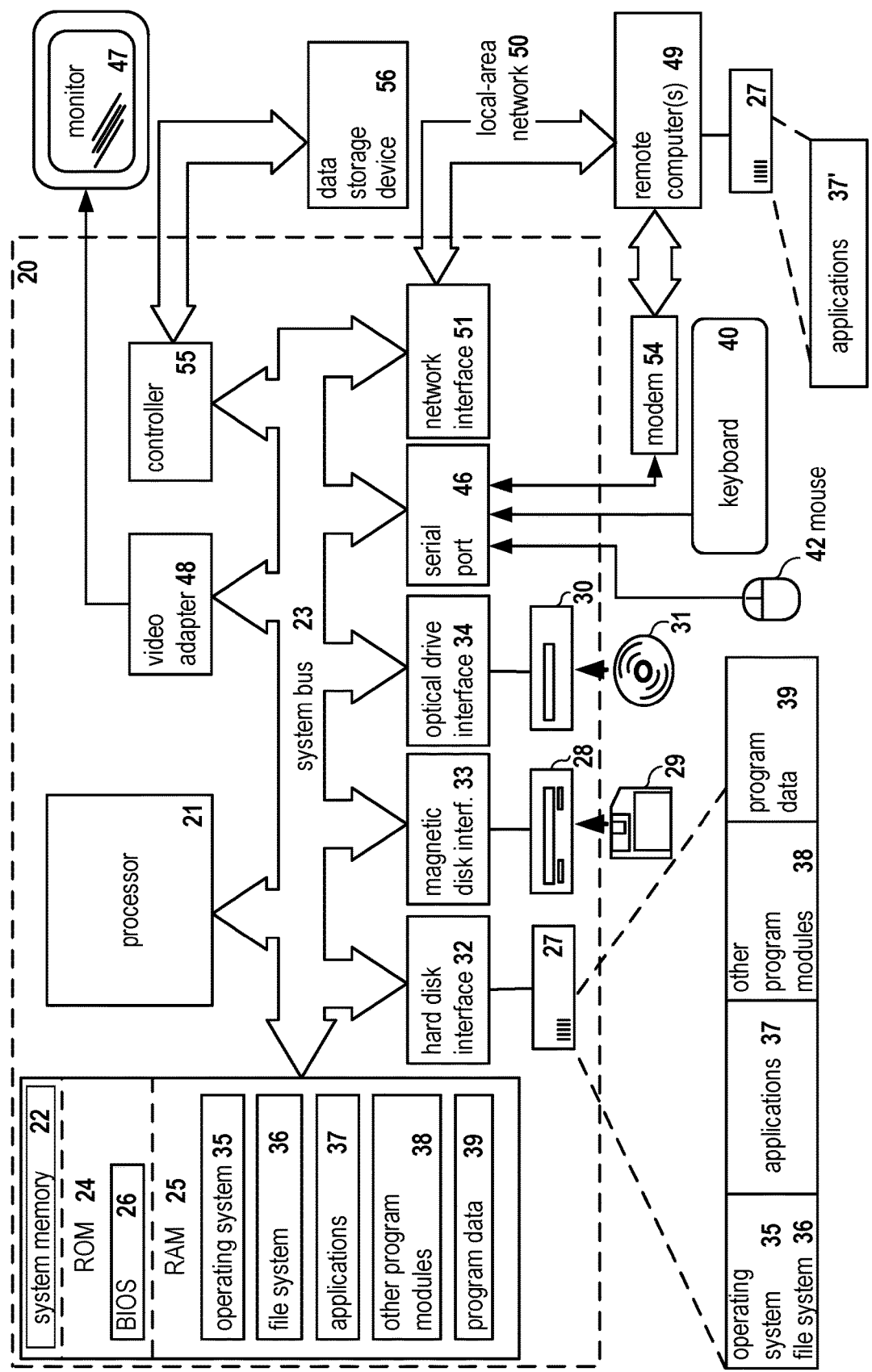
FIG. 8 is a block diagram of a general-purpose computer system on which the disclosed system and method can be implemented according to an exemplary aspect.

FIG. 8 is a block diagram illustrating a general-purpose computer system 20 on which aspects of systems and methods for protecting against a DDoS attack may be implemented in accordance with an exemplary aspect. It should be noted that the computer system 20 can correspond to the modules 130, 630, servers 140, and hardware 625 described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 comprises a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 8, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for protecting against a distributed denial-of-service (DDoS) attack, the method comprises:
   receiving one or more requests from a first user for a service executing on a server;
   generating a first vector associated with the first user comprised of a plurality of characteristics indicative of the first user accessing the service;
   calculating a comparison between the first vector and a reference vector, wherein the reference vector comprises an averaged distribution of characteristics for a plurality of users accessing the service;
   calculating a difference between the first vector and the reference vector;
   responsive to determining that the calculated difference between the first vector and the reference vector exceeds a first threshold value, determining that the service is under a denial-of-service attack, that the first vector is indicative of behavior of repeat access requests of a webpage with a password, and that the first user is a malicious user;
   determining that the service is not under a denial-of-service attack and that the first user is a legitimate user responsive to determining the calculated difference is less than a second threshold value; and
   handling requests due to a possible cyberattack, shortening a time interval for gathering data for the reference vector, and reducing a threshold value used for the comparison responsive to receiving an indication that the service has ceased.

2. The method of claim 1, further comprising:
   gathering data associated with requests for the service associated with the plurality of users, wherein the data comprises path identifiers specified by the requests from the plurality of users; and
   generating the reference vector based on the gathered data comprising an averaged frequency of requests by path identifier.

3. The method of claim 1, further comprising:
   generating the reference vector based on gathered data associated with parameters of HTTP requests from the plurality of users.

4. The method of claim 1, wherein the denial-of-service attack comprises a low-and-slow denial of service attack.

5. A system for protecting against a distributed denial-of-service (DDoS) attack, the system comprises:
   a memory device; and
   a hardware processor configured to:
   receive one or more requests from a first user for a service executing on a server;
   generate a first vector associated with the first user comprised of a plurality of characteristics indicative of the first user accessing the service;
   calculate a comparison between the first vector and a reference vector, wherein the reference vector comprises an averaged distribution of characteristics for a plurality of users accessing the service;
   calculate a difference between the first vector and the reference vector;
   responsive to determining that the calculated difference between the first vector and the reference vector exceeds a first threshold value, determine that the service is under a denial-of-service attack, that the first vector is indicative of behavior of repeat access requests of a webpage with a password, and that the first user is a malicious user;
   determining that the service is not under a denial-of-service attack and that the first user is a legitimate user responsive to determining the calculated difference is less than a second threshold value; and
   handling requests due to a possible cyberattack, shortening a time interval for gathering data for the reference vector, and reducing a threshold value used for the comparison responsive to receiving an indication that the service has ceased.

6. The system of claim 5, wherein the processor is further configured to:
   gather data associated with requests for the service associated with the plurality of users, wherein the data comprises path identifiers specified by the requests from the plurality of users; and
   generate the reference vector based on the gathered data comprising an averaged frequency of requests by path identifier.

7. The system of claim 5, wherein the processor is further configured to:
   generate the reference vector based on gathered data associated with parameters of HTTP requests from the plurality of users.

8. The system of claim 5, wherein the denial-of-service attack comprises a low-and-slow denial of service attack.

9. A non-transitory computer readable medium comprising computer executable instructions for protecting against a distributed denial-of-service (DDoS) attack, including instructions for:
   receiving one or more requests from a first user for a service executing on a server;

generating a first vector associated with the first user comprised of a plurality of characteristics indicative of the first user accessing the service;

calculating a comparison between the first vector and a reference vector, wherein the reference vector comprises an averaged distribution of characteristics for a plurality of users accessing the service;

calculating a difference between the first vector and the reference vector;

responsive to determining that the calculated difference between the first vector and the reference vector exceeds a first threshold value, determining that the service is under a denial-of-service attack, that the first vector is indicative of behavior of repeat access requests of a webpage with a password, and that the first user is a malicious user;

determining that the service is not under a denial-of-service attack and that the first user is a legitimate user responsive to determining the calculated difference is less than a second threshold value; and handling requests due to a possible cyberattack, shortening a time interval for gathering data for the reference vector, and reducing a threshold value used for the comparison responsive to receiving an indication that the service has ceased.

10. The non-transitory computer readable medium of claim 9, further comprising instructions for:

gathering data associated with requests for the service associated with the plurality of users, wherein the data comprises path identifiers specified by the requests from the plurality of users; and generating the reference vector based on the gathered data comprising an averaged frequency of requests by path identifier.

11. The non-transitory computer readable medium of claim 9, further comprising instructions for:

generating the reference vector based on gathered data associated with parameters of HTTP requests from the plurality of users.

12. The non-transitory computer readable medium of claim 9, wherein the denial-of-service attack comprises a low-and-slow denial of service attack.

* * * * *